(12) United States Patent
Inuzuka et al.

(10) Patent No.: US 7,600,600 B2
(45) Date of Patent: Oct. 13, 2009

(54) SEAT BELT RETRACTOR AND SEAT BELT DEVICE

(75) Inventors: Koji Inuzuka, Tokyo (JP); Koji Tanaka, Tokyo (JP); Masato Takao, Tokyo (JP)

(73) Assignee: Takata Corporation, Tokyo (JP)

( * ) Notice: Subject to any disclaimer, the term of this patent is extended or adjusted under 35 U.S.C. 154(b) by 504 days.

(21) Appl. No.: 11/483,554

(22) Filed: Jul. 11, 2006

(65) Prior Publication Data

US 2007/0018445 A1 Jan. 25, 2007

(30) Foreign Application Priority Data

Jul. 19, 2005 (JP) .............................. 2005-208986

(51) Int. Cl.
 *B60L 3/00* (2006.01)
(52) U.S. Cl. ..................... 180/272; 280/807; 242/250
(58) Field of Classification Search ......... 280/806–807; 180/268, 272
See application file for complete search history.

(56) References Cited

U.S. PATENT DOCUMENTS

| 5,788,281 | A | 8/1998 | Yanagi et al. | |
| 6,485,057 | B1 * | 11/2002 | Midorikawa et al. | 280/807 |
| 6,604,597 | B2 * | 8/2003 | Fujii et al. | 180/268 |
| 7,040,444 | B2 * | 5/2006 | Midorikawa et al. | 180/286 |
| 7,237,640 | B2 * | 7/2007 | Tobata | 180/268 |
| 7,306,261 | B2 * | 12/2007 | Nomura | 280/803 |
| 7,374,206 | B2 * | 5/2008 | Nomura | 280/807 |
| 7,380,740 | B2 * | 6/2008 | Tanaka et al. | 242/374 |
| 2003/0015864 | A1 * | 1/2003 | Midorikawa et al. | 280/807 |
| 2004/0066027 | A1 * | 4/2004 | Ingemarsson | 280/805 |
| 2004/0232268 | A1 * | 11/2004 | Karwaczynski | 242/390.9 |
| 2005/0011983 | A1 | 1/2005 | Inuzuka et al. | |
| 2005/0012320 | A1 * | 1/2005 | Tobata | 280/806 |
| 2006/0113419 | A1 * | 6/2006 | Nomura | 242/374 |
| 2006/0220368 | A1 | 10/2006 | Takao et al. | |
| 2006/0231664 | A1 | 10/2006 | Takao et al. | |
| 2007/0018445 | A1 * | 1/2007 | Inuzuka et al. | 280/806 |
| 2007/0029772 | A1 * | 2/2007 | Takao et al. | 280/801.1 |

FOREIGN PATENT DOCUMENTS

| DE | 196 36 448 A1 | 4/1997 |
| EP | 1 498 326 A | 1/2005 |
| EP | 1 707 455 A | 10/2006 |
| EP | 1 712 435 A | 10/2006 |
| JP | 6-71333 | 10/1994 |

\* cited by examiner

*Primary Examiner*—Paul N Dickson
*Assistant Examiner*—Drew Brown
(74) *Attorney, Agent, or Firm*—Foley & Lardner LLP

(57) ABSTRACT

The disclosed seat belt retractor and device can be useful to reliably warn the vehicle occupant of various hazards, such as obstacles or the dozing of the driver. The seat belt retractor and device can comprise an electric motor, a spool for retracting a seat belt to restrain a vehicle occupant, and a controller for controlling the driving of the electric motor. The controller can be configured to control the driving of the electric motor so that several operations for increasing and decreasing the tension acting on the seat belt by the spool are repeated for warning the vehicle occupant. In addition, the controller can be configured to control the driving of the electric motor so that a motion of the spool in a seat belt retracting direction is larger in an initial operation relative to subsequent operations.

16 Claims, 5 Drawing Sheets

SEAT BELT RETRACTOR AND SEAT BELT DEVICE

BACKGROUND

The present invention relates to a seat belt retractor to be mounted in a vehicle.

In the related art, a seat belt device that has various structures is known for restraining a vehicle occupant by means of a seat belt in a vehicle, such as an automobile.

Japanese Unexamined Utility Mode Registration Application Publication No. 6-71333 (hereinafter known as the '333 reference) discloses a structure of a seat belt device, which retracts and withdraws the seat belt by driving a motor. The technology in the '333 reference employs a structure that retracts and withdraws the seat belt through the use of a spool driven by a motor. The tension of the seat belt is intermittently varied by driving the motor, and thus the restraining force can be varied. Accordingly, it is possible to warn a driver with respect to a vehicle collision.

However, when the warning is conducted by the seat belt device disclosed in the '333 reference with respect to a vehicle collision, the seat belt has an initial slack, and thus a part of the rotation of the motor is used to remove the slack at the time of an initial operation. Accordingly, it is impossible to obtain the desired belt tension that is useful to warn the vehicle occupant.

The present seat belt retractor has been made to solve the above-mentioned problem. It is an object of the present disclosure to provide an effective technology that is useful to reliably warn a vehicle occupant by using the seat belt of a seat belt retractor to retract/withdraw the seat belt depending on the driving of the electric motor.

The invention is provided to address the above-mentioned problem. Although the invention can be typically applied to a seat belt retractor mounted in a vehicle such as an automobile, the invention can be applied to a structure of a seat belt retractor that is mounted in a vehicle other than the automobile, for example, an airplane, a ship, an electric train, a bus, and so on.

SUMMARY

In a first embodiment of the present invention, a seat belt retractor is disclosed which is mounted in a vehicle and includes at least an electric motor, a spool, and a controller.

The spool can comprise a member that retracts and withdraws the seat belt for restraining a vehicle occupant. The seat belt to be retracted or withdrawn with the spool is a long belt to be fastened about a vehicle occupant seated in a seat, and is called a "webbing." Typically, the seat belt is fastened about the vehicle occupant seated in a vehicle seat during the restraint of the vehicle occupant during a vehicle collision. Thus, the vehicle occupant is restrained. Furthermore, if necessary, a power transmission mechanism is provided between the electric motor and the spool. The power transmission mechanism forms a connecting state in which the electric motor and the spool are connected to each other and a disconnecting state in which the connecting state is released.

The controller of the present invention comprises a unit for controlling at least the electric motor. The controller controls a driving direction of the electric motor, a driving time, a driving force, and the like. The controller can typically comprise a CPU (central processing unit), input and output units, a memory unit, peripheral units, etc. The controller may be dedicatedly provided to the seat belt retractor or may be used as a controller for controlling a driving system or an electrical system of the vehicle as well as controlling the seat belt retractor.

In the present invention, the controller controls the driving of the electric motor so that several operations for increasing and decreasing the tension acting on the seat belt by the spool are repeated so as to warn the vehicle occupant at the time of the fastening of the seat belt to the vehicle occupant (typically, a driver). Specifically, a warning is performed in the following cases: in the case of determining that the obstacles (for example, other vehicles, obstacles, pedestrians, etc) around the vehicle are in a predetermined range or the vehicle is highly in danger of colliding with the obstacles or in the case of determining that the driver falls asleep. That is, the retractor can serve as a warning unit (a warning system) for warning the vehicle occupant as well as a restraining unit for restraining the vehicle occupant by means of the seat belt.

Meanwhile, when the driver is warned by means of the retracting operation of the seat belt, if the seat belt 3 has an initial slack, a part of the rotation of the motor is typically used to remove the slack at the time of the initial operation. Accordingly, it is impossible to obtain the desired belt tension that is useful to warn the vehicle occupant.

In the present invention, the controller controls the driving of the electric motor so that a motion of the spool becomes relatively larger in a seat belt retracting direction in the initial operation of the several operations. Here, the "initial operation" includes the first or the first several operations of the operations that are repeated several times. For example, the seat belt retractor can employ a step in which the motion of the spool in a first operation serving as an "initial operation" is larger as compared to the motion of the spool at the second or third operation. Another example is when the seat belt retractor can employ a step in which the motions of the spool in the first and the second operations serving as the "initial operations" are larger as compared to the motion of the spool at the third operation.

According to the first embodiment of the seat belt retractor, the number of revolutions of the spool in the initial operation is larger than those in the following operations. Therefore, if the seat belt has an initial slack, it is possible to again generate the tension larger than a desired belt tension useful to warn the vehicle occupant after the slack is removed. In this case, even if the seat belt does not nearly have an initial slack, it goes without saying that the tension larger than the desired belt tension is obtained. Accordingly, it is possible to quickly and reliably warn the vehicle occupant by using the seat belt at any one of the retracting operations of the electric motor that is repeated several times.

According to a second embodiment of the present invention, a seat belt retractor is disclosed in which the controller of the seat belt retractor increases relatively at least one of the motor output or rotation time of the electric motor in the initial operation so that the motion of the spool becomes relatively larger in the seat belt retracting direction. The seat belt retractor can include a control for relatively increasing both the motor output and the rotation time of the electric motor in the first operation. For example, the rotational speed of the motor can be increased by increasing the motor output of the electric motor when the rotation times of the motor are set to have the same values in each of the motor retracting operations, and thus the motion of the spool can become larger. Conversely, when the rotation time of the electric motor is increased and the motor outputs are set to have the same values in each of the motor retracting operations, the motion of the spool can also become larger. Furthermore, in the control for increasing the motor output, each of the current value (known as a "control current value") and the voltage value (known as an "applied voltage value") in the initial operation is set to be larger than that of the subsequent operations.

According to the second embodiment of the seat belt retractor, it is possible to quickly and reliably warn the vehicle occupant by means of the seat belt at any one of the retracting operations of the electric motor which is repeated several times by the control for increasing the motor output or the rotation time of the motor in the initial operation.

According to a third embodiment of the present invention, a seat belt device is disclosed in which the seat belt device is installed on a vehicle and includes at least a seat belt, an electric motor, a spool, a controller, a buckle, a tongue, and a detecting sensor.

The seat belt can be a long belt to be fastened to a vehicle occupant seated in a vehicle seat, and is called a "webbing." Typically, the seat belt is fastened about the vehicle occupant seated in a vehicle seat during the restraint of the vehicle occupant during a vehicle collision. Therefore, the vehicle occupant is restrained. Furthermore, the buckle can comprise a member fixed to the vehicle. The tongue can comprise a member, which is provided to the seat belt and is engaged with the buckle at the time of the fastening of the seat belt. The detecting sensor can comprise a unit for detecting that the tongue is engaged with the buckle. In addition, the electric motor, the spool, and the controller can have similar functions as the components of the seat belt retractor according to the first embodiment of the present invention.

That is, the seat belt device can serve as a warning unit (a warning system) for warning the vehicle occupant as well as a restraining unit for restraining the vehicle occupant by means of the seat belt. Furthermore, the controller can control the electric motor so that a motion of the spool becomes relatively larger in a seat belt retracting direction in the initial operation of the operations that are repeated several times.

According to the structure of the seat belt device of the third embodiment, the number of revolutions of the spool in the initial operation can be larger than those in the subsequent operations. Therefore, if the seat belt has an initial slack, it is possible to again generate the tension larger than a desired belt tension useful to warn the vehicle occupant after the slack is removed. In this case, even if the seat belt does not have an initial slack, it goes without saying that the tension larger than the desired belt tension is obtained. Accordingly, it is possible to quickly and reliably warn the vehicle occupant by using the seat belt at any one of the retracting operations of the electric motor which is repeated several times.

According to a fourth embodiment of the present invention, a seat belt device is disclosed in which the controller increases relatively at least one of the motor output or rotation time of the electric motor in the initial operation so that the motion of the spool becomes relatively larger in the seat belt retracting direction.

Therefore, it is possible to quickly and reliably warn the vehicle occupant by means of the seat belt at any one of the retracting operations of the electric motor which is repeated several times by a control for increasing the motor output or the rotation time of the motor.

According to a fifth embodiment of the present invention, a vehicle with a seat belt device is disclosed in which the vehicle with a seat belt device includes at least the seat belt device according to anyone of the previous embodiments. In the vehicle, the seat belt device is accommodated in the accommodating space of the vehicle, for example, the accommodating space within a pillar, the accommodating space within a seat, or the accommodating space of other portions of the vehicle.

According to the structure of the vehicle with a seat belt retractor, it is possible to provide a vehicle having the seat belt device that can quickly and reliably warn the vehicle occupant by means of the seat belt at any one of the retracting operations of the electric motor repeated several times and is accommodated in the accommodating space of the vehicle.

As described above, in the seat belt structure that retracts and withdraws the seat belt for restraining a vehicle occupant depending on the driving of the electric motor, particularly, in the initial operation of the operations of the spool that are repeated several times for increasing/decreasing the tension acting on the seat belt, the controller controls the electric motor so that a motion of the spool becomes relatively larger in a seat belt retracting direction. Accordingly, it is possible to reliably warn the vehicle occupant by means of the seat belt.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Hereinafter, embodiments of the present invention will be described in detail with reference to the drawings. First, an embodiment of the present invention will be described with reference to FIGS. 1 and 2.

Figure 1:
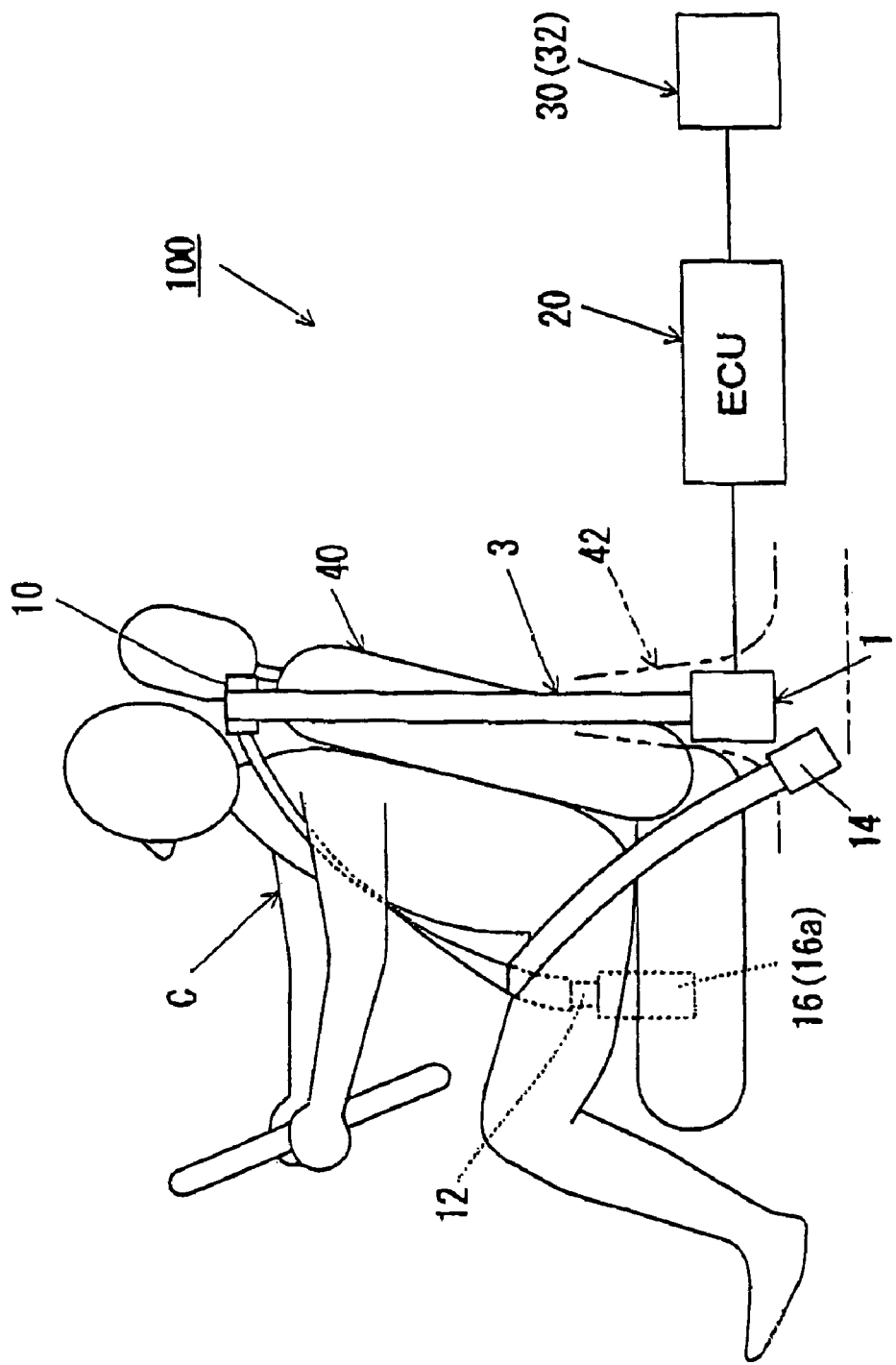
FIG. 1 shows a schematic view of a seat belt device 100 according to an embodiment of the present invention.
Figure 2:
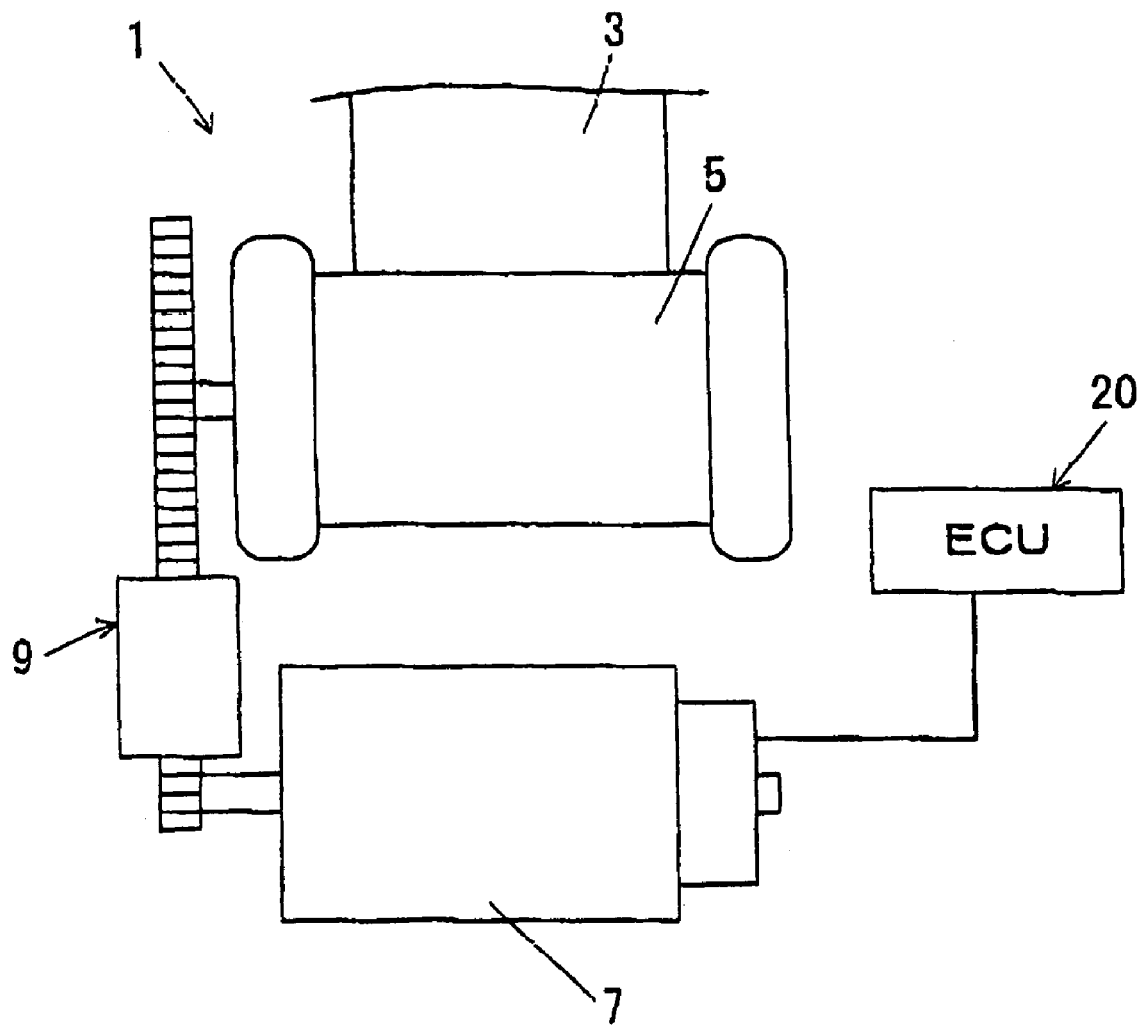
FIG. 2 shows a schematic view of the seat belt retractor 1 shown in FIG. 1.

FIG. 1 is a view showing the structure of a seat belt device 100 according to an embodiment of the present invention. FIG. 2 is a view showing the surrounding structure of the seat belt retractor 1 shown in FIG. 1.

As shown in FIG. 1, the seat belt device 100 of the present embodiment is a seat belt device for a vehicle, which is mounted in the vehicle. The seat belt device 100 includes a seat belt retractor 1, a seat belt 3, a shoulder guider anchor 10, a tongue 12, an outer anchor 14, a buckle 16, and an ECU 20 as the main components. In addition, a vehicle is provided with an input element 30. The input element 30 detects various information, such as information about a collision prediction or collision occurrence of the vehicle, the driving state of the vehicle, the seating position or the physique of a vehicle occupant seated on the seat, the surrounding traffic conditions, and the weather or the time zones. Then, the input element 30 inputs the detected information into the ECU 20. The detected information of the input element 30 is transmitted to the ECU 20 continuously or at predetermined times so that the detected information of the input element 30 can be used for controlling the operation of the seat belt device 100 or the like.

Specifically, the input element 30 can include a vehicle collision information detecting sensor 32 for detecting information about a collision of the vehicle, such as a collision prediction or actual collision occurrence of the vehicle. The vehicle collision information detecting sensor 32 can comprise a sensor capable of detecting the detected information (the detected signals), such as the distance between the vehicle and the objects (such as other vehicles, obstacles, pedestrians, etc) that may collide against the vehicle or the relative velocity, the relative acceleration, and the three-directional (X-axis, Y-axis, Z-axis) acceleration acting on the vehicle. The vehicle collision information detecting sensor 32 may comprise a single detecting sensor or may comprise a combination of single detecting sensors. Specifically, the vehicle collision information detecting sensor 32 can comprise a millimeter-wave radar, a laser radar, an acceleration sensor, a camera sensor, or the like.

The seat belt 3 can be a long belt (webbing) that is used to restrain or release a vehicle occupant C (such as a driver) seated in a vehicle seat 40 (such as a driver's seat). The seat belt 3 can correspond to the "seat belt for restraining a vehicle occupant" of the present invention. The seat belt 3 is withdrawn from a seat belt retractor 1 fixed to the vehicle and is connected to an outer anchor 14 by a tongue 12 via a shoulder guide anchor 10 provided in the portion corresponding to the shoulder of the vehicle occupant C. The shoulder guide anchor 10 functions to lock and guide the seat belt 3 in the portion corresponding to the shoulder of the vehicle occupant C. The seat belt 3 is fastened about the vehicle occupant C by inserting (engaging) the tongue 12 into a buckle 16 fixed to the vehicle body. The tongue 12 can correspond to a "tongue" of the present invention while the buckle 16 with which the tongue 12 is engaged can correspond to a "buckle."

The buckle 16 is provided with a buckle switch 16a, and the buckle switch 16a detects that the seat belt buckle is operated by inserting the tongue 12 into the buckle 16 (the fastening of the seat belt). The information detected by the buckle switch 16a is transmitted to the ECU 20, and thus determines whether the seat belt is fastened or not. The buckle switch 16a can correspond to a "detecting sensor for detecting that the tongue is engaged with the buckle."

The seat belt retractor 1 is a unit capable of retracting and withdrawing the seat belt 3 by means of a spool 5 and a motor 7 to be described below. The seat belt retractor 1 can correspond to a "seat belt retractor." As shown in FIG. 1, the seat belt retractor 1 can be mounted in the accommodating space, which may be formed in a B pillar 42 of the vehicle.

The ECU 20 has a function that causes the seat belt retractor 1 to start on the basis of the signals from the input element 30 and various operating mechanisms to be controlled. The ECU can comprise a CPU (central processing unit), input and output units, a memory unit, peripheral units, etc. The ECU 20 can control a motor 7, to be described below, of the seat belt retractor 1. Specifically, the ECU 20 can control the amount or the direction of the current supplied to an electromagnetic coil of the motor 7. Accordingly, the rotational speed, the rotation direction, the rotation time, and the rotational torque (the output) of the motor shaft are varied. As described in detail below, the ECU 20 is composed of a unit for controlling the driving of the motor 7 and is composed of a unit for switching a state, in which a driving force of the motor 7 is transmitted to the spool 5, by controlling a power transmission mechanism 9 (to be described below). In addition, the ECU 20 has a function to detect (measure) the current value of the motor during the operation of the motor 7. The ECU 20 can correspond to a "controller."

Moreover, the ECU 20 may be provided to the seat belt retractor 1 as a dedicated controller. Alternatively, the ECU may be used as a controller for controlling a driving system or an electrical system of the vehicle as well as for controlling the seat belt retractor 1.

The spool 5 shown in FIG. 2 is formed in the shape of a rod or a cylinder, and the outer periphery (the seat belt contacting surface) of the spool serves as a retracting surface of the seat belt 3. The spool 5 is a member that retracts and withdraws the seat belt 3 for restraining the vehicle occupant depending on the driving of the motor 7. The motor 7 serves as a "driving motor" while the spool 5 can correspond to a "spool."

Furthermore, in the present embodiment, the power transmission mechanism 9 is provided between the spool 5 and the motor 7. The power transmission mechanism 9 can comprise a mechanism that forms a connecting state (the power transmission mode) in which the spool 5 and the motor 7 are connected to each other and a disconnecting state (the power interruption mode) in which the connecting state is released. The power transmission mechanism 9 is called a "clutch" in which gear members and the like are combined. The connecting state of the power transmission mechanism 9 is a state in which the power of the motor 7 can be transmitted to the spool through the power transmission mechanism 9. Accordingly, when the motor 7 is driven during the connecting state, the power of the motor 7 is transmitted to the spool 5 through the power transmission mechanism 9. In this case, the rotational speed of the motor 7 is reduced by the power transmission mechanism 9. When the mechanical connection between the spool 5 and the motor 7 is released during the disconnecting state of the power transmission mechanism 9, the seat belt 3 can be easily withdrawn from the spool 5. In addition, if necessary, it is possible to employ a structure in which the spool 5 and the motor 7 are directly connected to each other, thus eliminating the power transmission mechanism 9 between the spool 5 and the motor 7.

Although not specifically shown in the present embodiment, the power transmission mechanism 9 can comprise a so-called "single-stage clutch." Accordingly, in the power transmission mode of the power transmission mechanism 9, when the motor 7 is driven so as to output a predetermined motor output, the rotational speed of the motor 7 is reduced and the rotational force thereof is transmitted to the spool 5 so that the spool 5 is driven with a predetermined rotational torque and revolutions per minute (RPM).

Furthermore, instead of the power transmission mechanism 9, it is possible to use a power transmission mechanism such that the rotational torque and RPM of the spool can be varied in several stages. For example, in a case in which a two-stage clutch for varying the rotational torque and RPM of the spool during two stages is used as the power transmission mechanism, when the seat belt is retracted onto the spool with a high tension, the power transmission mechanism can be set to a high speed reduction ratio mode in which the rotational torque is relatively high and the rotational speed is relatively low. Meanwhile, when the seat belt is rapidly retracted onto the spool, the power transmission mechanism can be set to a low speed reduction ratio mode in which the rotational torque is relatively low and the rotational speed is relatively high.

The state of the seat belt 3 can be set to one of the following seven seat belt setting modes. The motor 7 and the power transmission mechanism 9 are controlled by the ECU 20 on the basis of the seat belt setting modes.

(1) Belt Storage Mode

The belt storage mode is a belt mode in which the seat belt 3 is not used and is fully retracted onto the spool 5. In the belt storage mode, the motor 7 of the seat belt retractor 1 is not driven and the power transmission mechanism 9 is set in the power interruption mode. Therefore, only a very small belt tension acts on the seat belt 3, and thus the power consumption is zero.

(2) Belt Withdrawing Mode

The belt withdrawing mode is a belt mode in which the seat belt 3 is withdrawn from the spool 5 to be fastened. The seat belt retractor 1 is set in the power interruption mode. Thus, a small force is enough for withdrawing the seat belt 3. In this case, the motor 7 is not driven, and thus the power consumption is zero.

(3) Belt Retracting Mode for Fitting

The belt retracting mode for fitting is a belt mode in which an excessively withdrawn amount of the seat belt 3 is retracted to fit the seat belt 3 onto a vehicle occupant after the seat belt 3 is withdrawn and the tongue (for example, the tongue 12 in FIG. 1) is inserted into and engaged with the buckle to turn on the buckle switch (for example, the buckle switch 16a in FIG. 1). The belt retracting mode is also a mode in which the withdrawn seat belt 3 is retracted when the vehicle occupant moves from a normal fastening state of the seat belt 3 (in this case, the buckle switch is ON) so as to withdraw the seat belt 3 in a predetermined amount and then the vehicle occupant again is seated in the normal fastening state. In the belt retracting mode for fitting, the power transmission mechanism 9 of the seat belt retractor 1 is set in the power transmission mode, and the motor 7 thereof is controlled so as to be driven in the belt retracting direction with high rotational speed. Thus, when the seat belt 3 is rapidly retracted onto the spool 5 and then a small predetermined belt tension is generated, the motor 7 is stopped so that the seat belt 3 is fastened about the vehicle occupant.

(4) Normal Fastening Mode (Comfort Mode)

The normal fastening mode (also called the comfort mode) is a belt mode, which is set after the completion of the belt retracting mode for fitting and in which the seat belt 3 is in the normal fastening state. In the normal fastening mode, the motor 7 of the seat belt retractor 1 is not driven and the power transmission mechanism 9 is set in the power interruption mode. Thus, since a very small tension acts on the seat belt 3, the vehicle occupant does not feel discomfort even when fastening the seat belt 3. In addition, the power consumption is zero.

(5) Warning Mode

The warning mode is a belt mode in which the dozing of the driver or the occurrence of obstacles near the vehicle are detected during the drive of the vehicle in the normal fastening mode, and then the retracting operation of the seat belt 3 is repeated a predetermined number of times so as to warn the driver. In the warning mode, the motor 7 of the seat belt retractor 1 is set so as to be driven repeatedly. Therefore, a relatively large tension (smaller than the belt tension in an emergency mode to be described below) and a very small tension are alternately applied to the seat belt 3 so that the driver is warned about the dozing of the driver or the obstacles around the vehicle. The control in the emergency mode will be described in detail below.

(6) Emergency Mode

The emergency mode is a belt mode to be set when the vehicle is highly in danger of colliding with obstacles during the drive of the vehicle in the normal fastening mode, or in succession to the warning mode. In the emergency mode, the power transmission mechanism 9 of the seat belt retractor 1 is set in the power transmission mode, and the motor 7 thereof is controlled so as to be driven in the belt retracting direction with a high rotational speed and a high torque. When the seat belt 3 is rapidly retracted onto the spool 5 and a large predetermined belt tension is generated on the seat belt 3, the motor 7 is stopped so that the vehicle occupant is reliably restrained by the seat belt 3.

(7) Belt Retracting Mode for storage

The belt retracting mode for storage is a belt mode in which the seat belt 3 is fully retracted so as to be in a storage state when the buckle switch 16a in FIG. 1 is turned off by pulling out the tongue (for example, the tongue 12 in FIG. 1) from the buckle in order to release the fastening of the seat belt 3. In the belt retracting mode for storage, the power transmission mechanism 9 of the seat belt retractor 1 is set in the power transmission mode, and the motor 7 thereof is controlled so as to be driven in the belt retracting direction. Thus, the withdrawn seat belt 3 is rapidly retracted onto the spool 5. Then, when the seat belt 3 is completely retracted onto the spool 5 and a small predetermined belt tension is generated on the seat belt, the motor 7 is stopped. Accordingly, the seat belt 3 is in the belt storage mode in which a very small belt tension is generated on the seat belt.

Hereinafter, the control of the above-mentioned seat belt retractor 1 in the warning mode will be described in detail with reference to FIGS. 3 to 5. The control of the seat belt retractor 1 can be performed by the ECU 20 shown in FIGS. 1 and 2.

Figure 3:
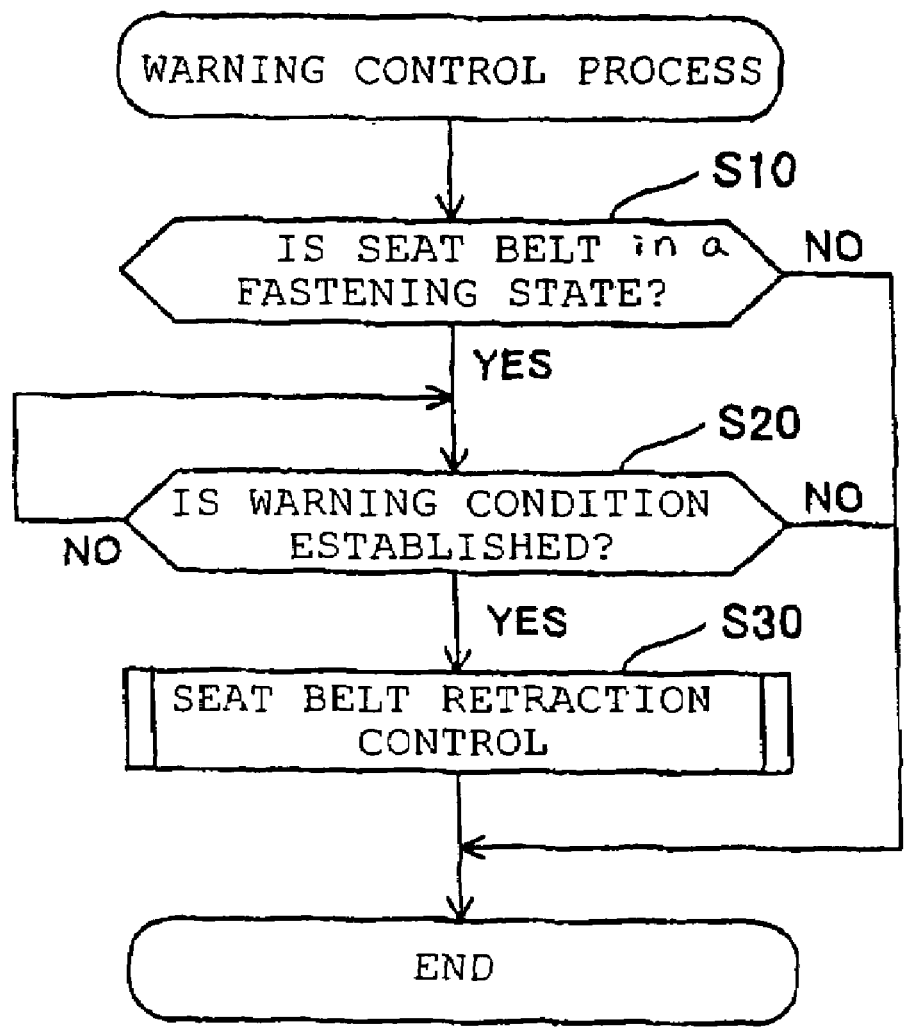
FIG. 3 shows a flow chart showing a warning control process in a warning mode of the seat belt retractor 1.

A flow chart of the warning control process in the warning mode of the seat belt retractor 1 according to an embodiment of the present invention is shown in FIG. 3.

As shown in FIG. 3, it is first determined whether the seat belt is in the seat belt fastening state in the step S10 in the retractor control processing. Specifically, it is determined that the seat belt is in the seat belt fastening state when the buckle switch 16a shown in FIG. 1 detects that the tongue 12 is inserted into the buckle 16. When the buckle switch 16a detects that the tongue 12 is disengaged from the buckle, it is determined that the seat belt is in the seat belt released state.

In step S10, when it is determined that the seat belt is in the fastening state (the YES path in step S10), the warning control process proceeds to step S20. In contrast, when it is determined that seat belt is the released state (the NO path in step S10), the warning control process is directly terminated.

Next, whether a warning condition is established is determined in the step S20 shown in FIG. 3. Specifically, it is determined that the warning condition is established in cases such as the following: the determination that obstacles (such as other vehicles, obstacles, pedestrians, etc) around the vehicle are in a predetermined range or that that the vehicle is highly in danger of colliding with the obstacles on the basis of the information detected by the vehicle collision information detecting sensor 32 shown in FIG. 1 or the determination that the driver is dozing on the basis of the information detected by the sensor for detecting the variation of the tension acting on the seat belt 3.

In step S20, if it is determined that the warning condition is established (the YES path in step S20), the warning control process proceeds to step S30 and then is terminated after the seat belt retraction control. In contrast, if it is determined that the warning condition is not established (the NO path in step S20), then the warning control process is directly terminated.

If the seat belt retraction control is performed by the warning mode in step S30 shown in FIG. 3, the motor 7 is driven so that the operations for increasing and decreasing the tension (the act of temporarily increasing the tension) acting on the seat belt 3 are repeated several times, thereby warning the vehicle occupant (such as the driver). The control can correspond to a "control for driving an electric motor so that the operations for increasing and decreasing the tension acting on the seat belt by the spool are repeated several times at the time of fastening of the seat belt about the vehicle occupant."

However, when the vehicle occupant is warned through the operations for retracting the seat belt 3, if the seat belt 3 has an initial slack, a part of the rotation of the motor is used to remove the slack at the time of an initial operation, typically, in the first operation. Accordingly, it is impossible to obtain the belt tension which is useful to warn the vehicle occupant.

In an embodiment of the present embodiment, the motor 7 is controlled so that the motion of the spool 5 becomes a maximum in a seat belt retracting direction in the first operation of the operations of the seat belt retraction control that repeat several times by the warning mode. Furthermore, in the present embodiment, the motor output or rotation time of the motor 7 is controlled to be relatively high in order to maximize the motion of the spool 5 in the seat belt retracting direction. The control can correspond to a "control for controlling an electric motor so that a motion of the spool becomes a maximum in a seat belt retracting direction in the first operation of the operations that repeat several times" or to a "control for relatively increasing at least one of the motor output or rotation time of the electric motor in the first operation."

Figure 4:
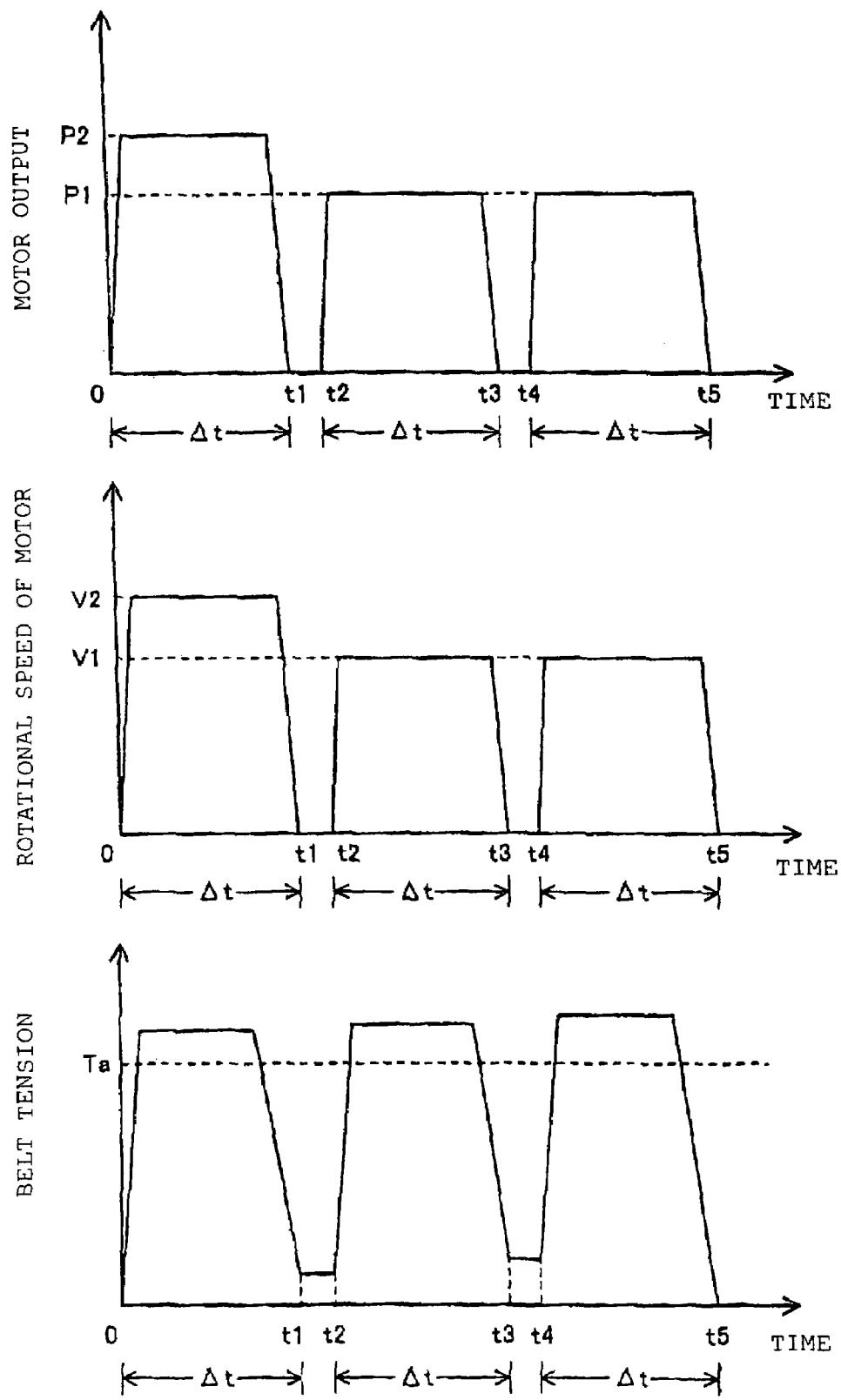
FIG. 4 shows the output and the rotational speed of a motor, and the temporal change of the belt tension in the seat belt retraction control of FIG. 3.
Figure 5:
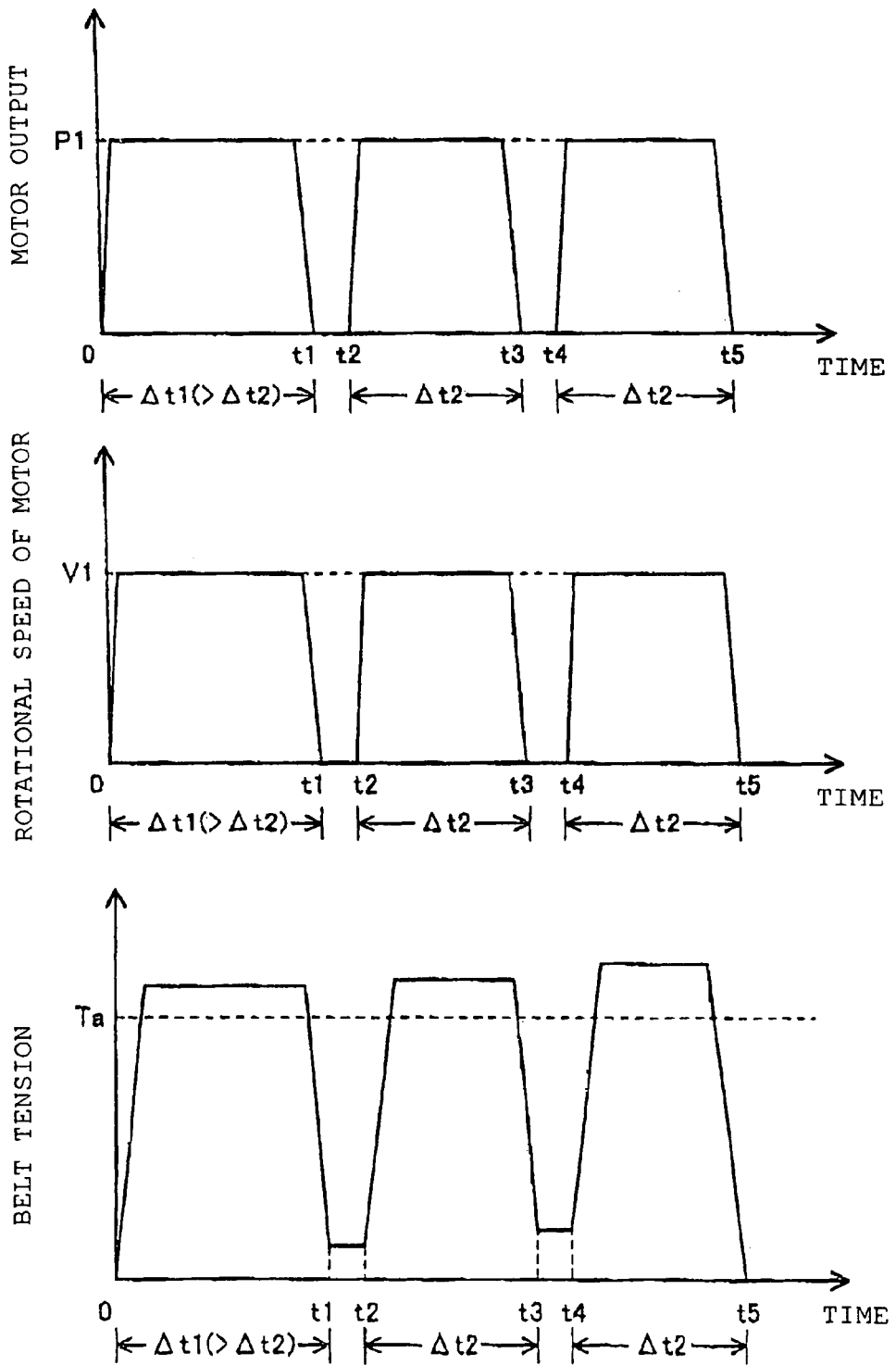
FIG. 5 shows the output and the rotational speed of a motor, and the temporal change of the belt tension in the seat belt retraction control of FIG. 3.

FIGS. 4 and 5 show the output and the rotational speed of the motor and the temporal change of the belt tension in the seat belt retraction control of FIG. 3. Furthermore, FIGS. 4 and 5 show the graphs of the results when the operations for increasing and decreasing the tension (the act of temporarily increasing the tension) acting on the seat belt 3 are repeated three times. The operations for increasing and decreasing the tension can be properly set so that the operations are repeated two times or four times or more.

The motor is controlled in the seat belt retraction control shown in FIG. 4 so that the motor output P2 at a first operation is higher than the motor outputs P1 in the second and third operations when the retracting operations of the motor 7 repeated three times are compared with one another. The motor output of the motor 7 is the product of the current value (called a "control current value") and the voltage value (called an "applied voltage value"). Accordingly, the motor 7 is controlled so that the current value and the voltage value in the first operation are set larger than those in the subsequent operations. Furthermore, in this case, the rotation times Δt of the motor are set to have the same values in each of the motor retracting operations.

For this reason, since the rotational speed V2 of the motor in the first operation is higher than the rotational speeds V1 of the motor in the subsequent operations, the number of revolutions of the spool 5 is larger in the first operation. Thus, if the seat belt 3 has an initial slack, it is possible to generate the tension larger than a desired belt tension Ta useful to warn the vehicle occupant after the slack is removed. In this case, even if the seat belt 3 does not have an initial slack, it goes without saying that the tension larger than the belt tension Ta is obtained. Accordingly, it is possible to quickly and reliably warn the vehicle occupant by using the seat belt 3 at any one of the retracting operations of the motor 7 repeated three times. Furthermore, in FIG. 4, the tension of the seat belt 3 in the first operation is controlled to have a nearly constant value in the range exceeding the belt tension Ta. However, the tension of the seat belt may overshoot the nearly constant value.

The belt tension Ta of FIG. 4 is a target tension in the warning mode and is defined as a tension causing the vehicle occupant to reliably perceive a warning. Typically, when the seat belt has a slack, at least the relationship between the motor output and the belt tension can be obtained by tests or analysis that are performed in advance. Then, the motor outputs P1 and P2 and the belt tension Ta can be set on the basis of the result of the tests or analysis.

Moreover, an embodiment of the present invention can employ a control in which the motor output in the first operation is relatively larger as compared to those in the subsequent operations, as the control shows in FIG. 4. Specifically, a first condition or a second condition can be employed. In the first condition, the motor output in the first operation serving as an "initial operation" is relatively larger as compared to the motor output at the second or third operation of the first three operations. In the second condition, the motor outputs in the first and second operations serving as the "initial operations" are relatively larger as compared to the motor output at the third operation. In the first condition, the motor output at the second operation and the motor output at the third operation may be set to have a same value, or may be set to have different values from each other. In the same way, in the second condition, the motor output in the first operation and the motor output at the second operation may be set to have a same value, or may be set to have different values from each other.

The motor is controlled in the seat belt retraction control shown in FIG. 5 so that the rotation time Δt1 in the first operation is longer than the rotation times Δt2 in subsequent operations when the retracting operations of the motor 7 repeated three times are compared with one another. Furthermore, in this case, the outputs and the rotational speeds of the motor are set to have same values in each of the motor retracting operations.

For this reason, the number of revolutions of the spool 5 is large in the first operation. Thus, if the seat belt 3 has an initial slack, it is possible to generate a tension larger than a desired belt tension Ta useful to warn the vehicle occupant after the slack is removed. In this case, even if the seat belt 3 does not nearly have an initial slack, it goes without saying that the tension larger than the belt tension Ta is obtained. Accordingly, it is possible to quickly and reliably warn the vehicle occupant by using the seat belt 3 at any one of the retracting operations of the motor 7 that is repeated three times. Here, the belt tension Ta of FIG. 5 is a target tension in the warning mode, and is defined as a tension causing the vehicle occupant to reliably perceive a warning. Typically, when the seat belt has an initial slack, at least the relationship between the motor output and the belt tension is obtained by tests or analysis that are performed in advance. Then, the rotation times Δt1 and Δt2 of the motor and the belt tension Ta can be set on the basis of the result of the tests or analysis.

Moreover, the present invention can employ a control in which the rotation time of the motor in the first operation is relatively larger as compared to those in the subsequent operations, as the control shows in FIG. 5. Specifically, a third condition or a fourth condition can be employed. In the third condition, the rotation time of the motor in the first operation serving as an "initial operation" is relatively larger as compared to the rotation time of the motor at the second or third operation of the first three operations. In the fourth condition, the rotation times of the motor in the first and the second operation serving as the "initial operations" are relatively larger as compared to the rotation time of the motor at the third operation. In the third condition, the rotation time of the motor at the second operation and the rotation time of the motor at the third operation may be set to have a same value or may be set to have different values from each other. In the same way, in the fourth condition, the rotation time of the motor in the first operation and the rotation time of the motor at the second operation may be set to have a same value or may be set to have different values from each other.

According to the seat belt retractor 1 of the present embodiment, specifically, when the warning control process shown in FIG. 3 is performed as shown in FIGS. 4 and 5, it is possible to quickly and reliably warn the vehicle occupant by using the seat belt 3. Accordingly, it is possible to make the vehicle occupant perform the avoidance operation required due to the vehicle collision or to warn the sleeping vehicle occupant.

Furthermore, when it is determined that the vehicle is highly in danger of colliding with obstacles on the basis of the information detected by the vehicle collision information detecting sensor 32, the above-mentioned emergency mode is performed in succession to the warning control process shown in FIG. 3. When a predetermined very large belt tension finally occurs on the seat belt 3, the motor 7 is stopped. Therefore, it is possible to perform a control in which the vehicle occupant is reliably restrained by the seat belt 3.

The invention is not limited to the above embodiments and may have various applications and modifications. For example, there may be other embodiments such as the following.

In the above-mentioned embodiment, it is disclosed that any one of the motor output or the rotation time of the motor 7 in the first operation is increased in the warning control process. However, in another embodiment, it can be configured so that both the motor output and the rotation time of the motor 7 in the initial operation are increased. Thus, the motion of the spool can be further increased. Accordingly, this embodiment is effective when it is expected that the seat belt has a large slack in the initial operation.

Moreover, if necessary, it is possible to provide a detecting sensor for detecting information directly about the rotation of the spool 5. Sensors, such as a hole sensor, a variable resistor, and a photo interrupter, can be adequately used as the rotation detecting sensor. It is possible to detect the detected information, such as whether the spool 5 is rotated, a motion, a rotation direction, a rotational speed, and an amount of rotation, by means of the rotation detecting sensor.

Moreover, although the structure of the seat belt retractor 1 to be mounted in a vehicle is disclosed in the above-mentioned embodiments, the seat belt retractor can be used in a seat belt device mounted in the vehicle for transporting vehicle occupants, for example, an automobile, an airplane, a ship, an electric train, a bus, etc.

The priority application, Japanese Patent Application No. 2005-208986, filed on Jul. 19, 2005, including the specification, drawings, claims and abstract, is incorporated herein by reference in its entirety.

Given the disclosure of the present invention, one versed in the art would appreciated that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor to be mounted in a vehicle comprising:
   an electric motor;
   a spool for retracting a seat belt to restrain a vehicle occupant depending on a driving of the electric motor; and
   a controller for controlling the driving of the electric motor,
   wherein the controller is configured to perform a warning control process in which the driving of the electric motor is controlled such that several alternating operations for increasing and decreasing tension acting on the seat belt by the spool are repeated for warning the vehicle occupant, and
   wherein the controller is configured during the warning control process to control the driving of the electric motor so that a motion of the spool in a seat belt retracting direction is larger in an initial operation of increasing the tension acting on the seat belt relative to motions of the spool in the seat belt retracting direction in subsequent operations of increasing the tension acting on the seat belt.

2. The seat belt retractor according to claim 1, wherein the controller is configured to control at least one of the motor output or rotation time of the electric motor so that the motion of the spool in the seat belt retracting direction is larger in the initial operation relative to the subsequent operations.

3. The seat belt retractor according to claim 2, wherein the controller is configured to control the motor output and the rotation time of the electric motor so that the motion of the spool in the seat belt retracting direction is larger in the initial operation relative to the subsequent operations.

4. The seat belt retractor according to claim 1, wherein the initial operation comprises a first operation acting on the seat belt and the subsequent operations comprise a third operation acting on the seat belt.

5. The seat belt retractor according to claim 4, wherein the initial operation further comprises a second operation acting on the seat belt.

6. The seat belt retractor according to claim 5, wherein the controller is configured such that the motion of the spool in the seat belt retracting direction during the first operation is larger than the motion of the spool in the seat belt retraction direction during the second operation.

7. The seat belt retractor according to claim 4, wherein the subsequent operations further comprises a second operation acting on the seat belt.

8. The seat belt retractor according to claim 7, wherein the controller is configured such that the motion of the spool in the seat belt retracting direction during the second operation is larger than the motion of the spool in the seat belt retraction direction during the third operation.

9. A seat belt device to be mounted in a vehicle comprising:
   a seat belt for restraining a vehicle occupant;
   an electric motor;
   a spool for retracting a seat belt to restrain the vehicle occupant depending on a driving of the electric motor;
   a controller for controlling the driving of the electric motor;
   a buckle for fixing to the vehicle;
   a tongue for engaging with the buckle at a time of fastening the seat belt; and
   a detecting sensor for detecting whether the tongue is engaged with the buckle,
   wherein the controller is configured to perform a warning control process in which the driving of the electric motor is controlled such that several alternating operations for increasing and decreasing tension acting on the seat belt by the spool are repeated for warning the vehicle occupant based on detected information detected by the detecting sensor, and wherein the controller is configured during the warning control process to control the driving of the electric motor so that a motion of the spool in a seat belt retracting direction is larger in an initial operation of increasing the tension acting on the seat belt relative to motions of the spool in the seat belt retracting direction in subsequent operations of increasing the tension acting on the seat belt.

10. The seat belt device according to claim 9, wherein the controller is configured to control at least one of a motor output or a rotation time of the electric motor so that the motion of the spool in the seat belt retracting direction is larger in the initial operation relative to the subsequent operations.

11. The seat belt device according to claim 10, wherein the controller is configured to control the motor output and the rotation time of the electric motor so that the motion of the spool in the seat belt retracting direction is larger in the initial operation relative to the subsequent operations.

12. The seat belt device according to claim 9, wherein the initial operation comprises a first operation and a second operation acting on the seat belt and the subsequent operations comprise a third operation acting on the seat belt.

13. The seat belt retractor according to claim 12, wherein the controller is configured such that the motion of the spool in the seat belt retracting direction during the first operation is larger than the motion of the spool in the seat belt retraction direction during the second operation.

14. The seat belt device according to claim 9, wherein the initial operation comprises a first operation acting on the seat belt and the subsequent operations comprise a second operation and a third operation acting on the seat belt.

15. The seat belt retractor according to claim 14, wherein the controller is configured such that the motion of the spool in the seat belt retracting direction during the second operation is larger than the motion of the spool in the seat belt retraction direction during the third operation.

16. A vehicle comprising:
a seat belt device comprising:
a seat belt for restraining a vehicle occupant;
an electric motor;
a spool for retracting a seat belt to restrain the vehicle occupant depending on a driving of the electric motor;
a controller for controlling the driving of the electric motor;
a buckle fixed to the vehicle;
a tongue for engaging with the buckle at a time of fastening the seat belt; and
a detecting sensor for detecting whether the tongue is engaged with the buckle,
wherein the controller is configured to perform a warning control process in which the driving of the electric motor is controlled such that several alternating operations for increasing and decreasing tension acting on the seat belt by the spool are repeated for warning the vehicle occupant based on detected information detected by the detecting sensor,
wherein the controller is configured during the warning control process to control the driving of the electric motor so that a motion of the spool in a seat belt retracting direction is larger in an initial operation of increasing the tension acting on the seat belt relative to motions of the spool in the seat belt retracting direction in subsequent operations of increasing the tension acting on the seat belt, and
wherein the seat belt device is accommodated in an accommodating space of the vehicle.

* * * * *